United States Patent [19]
Martin

[11] 3,982,777
[45] Sept. 28, 1976

[54] PIPE CONNECTION TO MANHOLES AND THE LIKE

[76] Inventor: Adam Eugene Martin, P.O. Box 399 R.D. 1, Narvon, Pa. 17555

[22] Filed: Mar. 14, 1975

[21] Appl. No.: 558,315

[52] U.S. Cl. .............................. 285/192; 29/450; 285/351
[51] Int. Cl.² .................................... F16L 41/00
[58] Field of Search .......... 285/192, 351, 344, 189, 285/113, 208; 52/20, 21; 29/450, 451; 277/191

[56] References Cited
UNITED STATES PATENTS

| | | | |
|---|---|---|---|
| 2,710,630 | 6/1955 | Greer | 285/208 X |
| 3,339,014 | 8/1967 | Oxley | 285/351 X |
| 3,345,089 | 10/1967 | Stepanich | 285/231 X |
| 3,348,850 | 10/1967 | Scales | 285/230 X |
| 3,815,214 | 6/1974 | Kyle | 285/189 X |
| 3,874,063 | 4/1975 | Skinner et al | 285/189 X |

FOREIGN PATENTS OR APPLICATIONS

| | | | |
|---|---|---|---|
| 120,716 | 1/1931 | Austria | 285/344 |
| 324,854 | 2/1930 | United Kingdom | 285/344 |
| 310,455 | 6/1929 | United Kingdom | 285/344 |

Primary Examiner—Thomas F. Callaghan
Attorney, Agent, or Firm—Paul & Paul

[57] ABSTRACT

A connection is provided between pipe (principally sewer pipe) and the wall of a manhole or like structure, whereby a hole passing through the wall of the manhole is provided with sloped tapers opening toward each side of the wall, through which the pipe is received, with resiliently compressible ring members being provided at each side of the wall, arranged in wedged engagement between the pipe and each tapered portion of the wall, clamping the pipe to the wall. The manhole will principally be of the cylindrical cast concrete type, and the rings will preferably be of the O-ring type. The pipe may be of various constructions. A particularly novel technique is provided for facilitating the connection, whereby forces exerted on the pipe from inside the manhole after a compressible ring has been applied thereto, are maintained while another ring is rolled into position against the tapered exterior surface, and then swaged into place.

7 Claims, 6 Drawing Figures

3,982,777

PIPE CONNECTION TO MANHOLES AND THE LIKE

In the art of sewer piping and the like, wherein pipes are brought into manholes, for distribution or interconnection with other piping lines, it has become commonplace to utilize cast concrete manholes. It is also commonplace to provide holes in walls of manholes for delivery of the pipe therethrough. Gaskets, rings and the like of various configurations have been used, all with respect to maintaining radially directed pressure on the pipe, as a fluid seal. Generally such arrangements require other connection means for fastening the pipe to the generally cylindrical wall of the manhole. These connection means generally take on the form of various externally applied clamping devices.

THE PRESENT INVENTION

The present invention departs from the prior art developments discussed above, in providing sealing rings that not only facilitate effecting a water-tight seal between the wall of the manhole and the pipe, but that also function as clamping members, for clamping the pipe structurally against movement relative to the manhole wall. The clamping is effected by placing the resiliently compressible rings under load such that they maintain axially or longitudinally directed tension forces on the pipe portion that is inside the wall structure of the manhole.

Accordingly, it is a primary object of this invention to provide a novel connection between a pipe through a hole in the wall of a manhole or like structure.

It is a further object of this invention to accomplish the object set forth immediately above, wherein such connection is accomplished by using a pair of resiliently compressible preferably rubber-like ring members arranged in wedged engagement between the pipe and tapered portions of the wall of the structure, clamping the pipe to the wall.

It is a further object of this invention to provide a novel cast manhole structure adapted for accomplishing the objects set forth above.

It is another object of this invention to provide a novel method of assembling a pipe into a wall of a manhole or like structure.

BRIEF DESCRIPTION OF THE DRAWING FIGURES

DETAILED DESCRIPTIONS OF THE PREFERRED EMBODIMENTS

Figure 1:
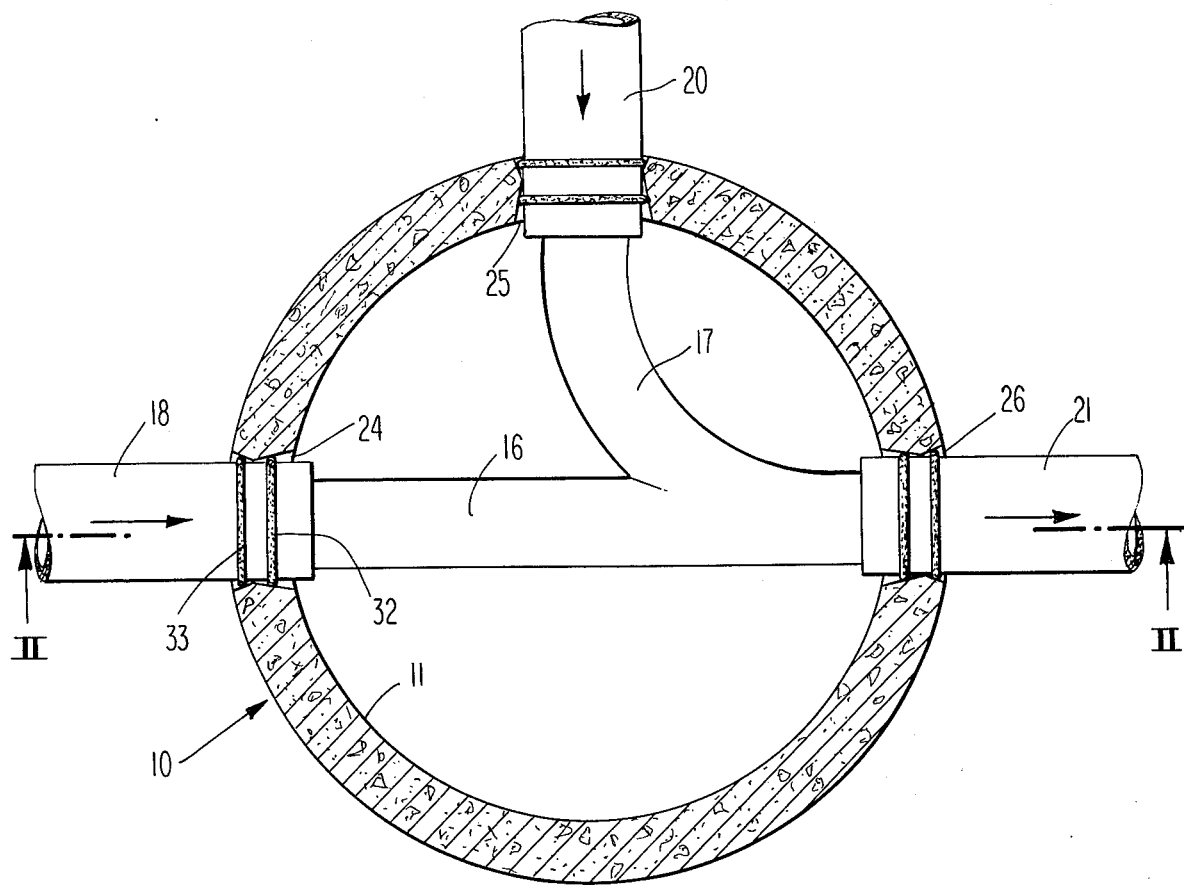
FIG. 1 is a horizontal sectional view taken through a cylindrical cast concrete manhole, looking downwardly into the bottom of the manhole and viewing the bottom of the manhole in plan, the view being taken generally along the line I—I of FIG. 2.
Figure 2:
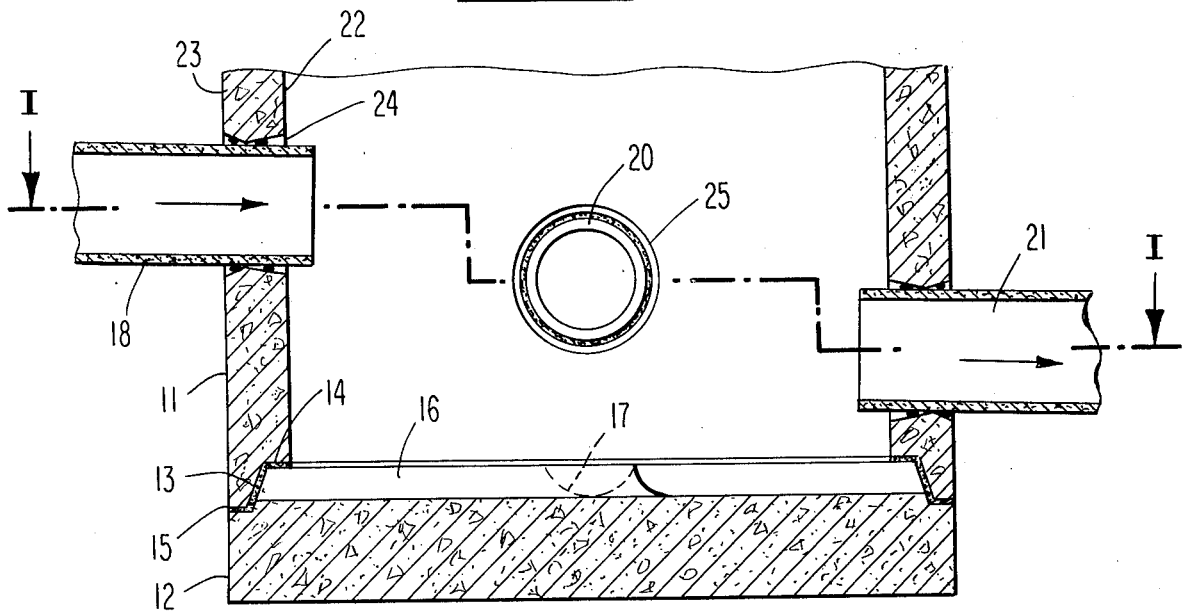
FIG. 2 is a vertical sectional view taken through the manhole and pipe arrangement illustrated in FIG. 1, generally along the line II—II of FIG. 1.

Referring now to the drawings in detail, reference is first made to FIG. 1, wherein a manhole generally designated by the numeral 10 is illustrated, as being of the cast concrete type. The manhole 10 comprises a cylindrical wall portion 11 and a bottom portion 12, both pre-formed for mutual engagement along frusto-conical surface 13 and ledges 14 and 15. The bottom portion 12 is provided with cast channels 16 and 17 for delivering storm sewer water or the like from pipes 18 and 20, respectively, out of the manhole 10 via lowermost pipe 21.

Wall portion 11 is generally of the right circular cylindrical configuration illustrated, although its configuration of course may vary, as may the configuration for the bottom 12 of the manhole 10. Moreover, the manhole 10 may take on various forms, even being a one-piece type, employing integral side wall and bottom wall portions (not illustrated).

The sidewall 11 of the manhole comprises an inner cylindrical surface 22 and an outer cylindrical surface 23, and three holes 24, 25 and 26 passing therethrough, between the inner and outer surfaces 22 and 23, respectively. Each of the holes is of substantially identical construction, illustrated in greater detail in FIG. 3 for the hole 24.

Figure 3:
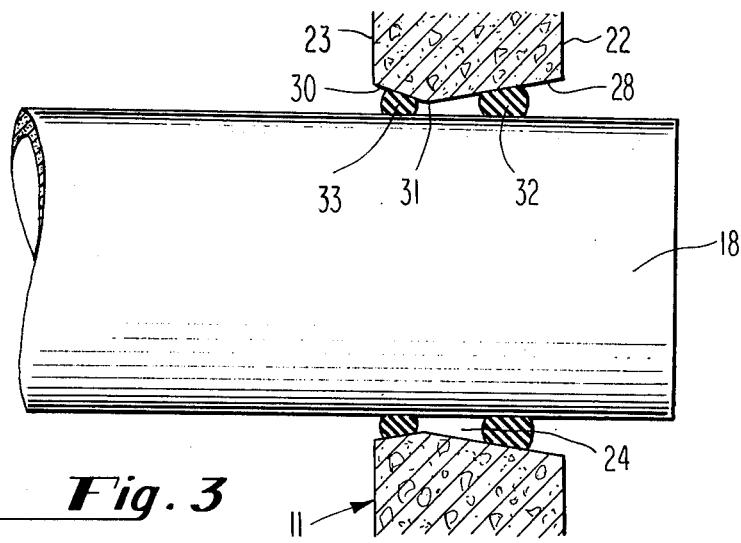
FIG. 3 is an enlarged fragmentary vertical sectional view, taken through a portion of the manhole, illustrating the manner in which the rings clampingly engage the pipe in clamped connection.

With particular reference to FIG. 3, an exemplary hole 24, representative of any of the holes through the side-wall 11 of the manhole is illustrated, having a long sloping taper of the frusto-conical type 28 adjacent its inner surface 22, at one end of the generally circular hole 24, and having a sharper frusto-conically tapered opening 30 adjacent the outer surface 23 of the wall 11, such tapered portion 28 and 30 meeting at a location 31 inside the wall 11, at which location 31 the hole 24 has its minimum diametral opening size.

The diameter of the hole portion 31 will generally be fixed for a given size pipe. The pipe 18, however, may vary in its outer diameter depending upon the material of construction, although its inner diameter will always be substantially the same for a given pipe size. For example, concrete pipe has a very large diameter, due to the heavier wall thickness, and can vary considerably depending upon various factors. Clay pipe generally has a smaller outside diameter than concrete pipe, for the same size inner diameter. Stainless steel pipe generally has an even smaller outside diameter for the same size inside diameter, and polyvinyl chloride generally has the smallest outside diameter for the same size inner diameter. Sewer pipes, particularly pipes adapted for storm sewers, may utilize any of the above-discussed types of pipe construction, and for versatility, the manhole 10 will be constructed with the smallest diametral portion 31 of a given hole 24 adapted for receiving the largest outer diameter size of pipe for a given hole size.

A pair of resiliently compressible rings or ring members 32 and 33 are provided, that preferably are not of the same size, although they can be, if desired. The ring members 32 will preferably be of rubber or synthetic rubber construction, and each will comprise a complete ring or hoop, in the preferred embodiment, also each being of generally circular cross-section, or of the O-ring type illustrated for example in FIGS. 4a and 4b. It will be seen that the rings 32 and 33 lend themselves to compression, as illustrated in FIG. 3, between the pipe 18 and the tapered portions 28 and 30 of the hole 24 in the wall 11.

It will be apparent that the tapered portions 28 and 30 may, if desired, be of identical tapers, although a preferred construction is similar to that illustrated in FIG. 3, wherein a long sloping or less sharp taper is provided opening into the interior of the manhole, and a sharper taper at the exterior.

The O rings 32 and 33 may be molded, or may be constructed from lengths of rubber or synthetic rubber or other suitable material, with the ends of the lengths being vulcanized to make circular constructions. In another embodiment (not illustrated), although less preferred, it is possible to utilize ring members that are not connected at their ends, such that the ring is only formed from otherwise flat lengths or resiliently compressible material, as it is applied over a pipe, against a frusto-conical wall portion. However, it will be understood that the pre-formed ring construction is greatly preferred.

It will also be apparent that in the embodiment of FIG. 3, the rings 32 and 33 are in wedged engagement between the pipe 18 and the surfaces of the wall 11 that provides the opening 24. This wedging provides a clamping of the pipe, under axially, or longitudinally directed forces (relative to the pipe) over that portion of the pipe between the rings 32 and 33. The manner in which these longitudinally directed tension forces come into play will be more apparent, with reference to FIGS. 4a, 4b and 4c, discussed in detail hereinafter. It will also be apparent that the tapered portions 28 and 30 may be concavely curved, if desired, although the linear tapers illustrated in FIG. 3 are preferred.

It will also be apparent that the resiliently compressible members 32 and 33, not only provide a clamping function as illustrated in FIG. 3, but also provide at the same time a double water-tight seal between the inside and the outside of the manhole.

Figure 4A:
FIGS. 4a, 4b and 4c are fragmentary vertical sectional views of sequential stages in the assembly of the connection of this invention.
Figure 4B:
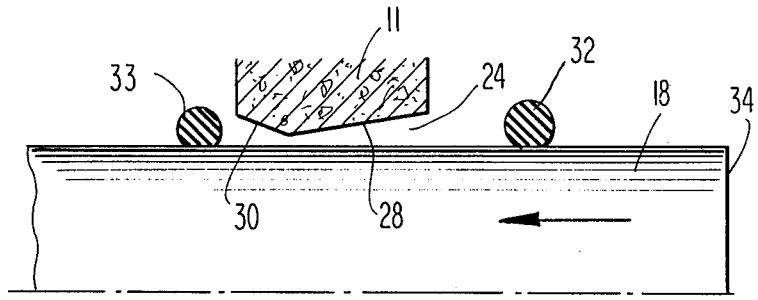
Figure 4C:
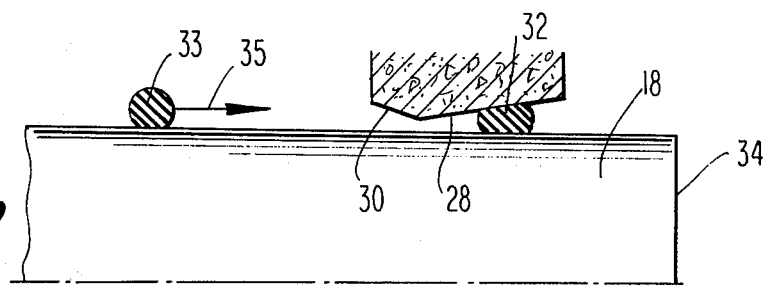

With reference now in particular to FIGS. 4a, 4b and 4c, it will be noted that the pipe 18 has been placed in the hole 24, with its right-most end 34 terminating inside the manhole. The normally bell end (not illustrated) of the pipe 18 is disposed outwardly of the wall 11.

Preferably, prior to inserting the end 34 of the pipe 18 into the hole 24, the outer O-ring has been applied over the end 34 of the pipe 18, and rolled along the pipe to about the position illustrated in FIG. 4a. At that point, the end of the pipe 34 was inserted through the hole 24, and O-ring 32 was applied thereover in like manner. The pipe 34 is then pushed outwardly by a person disposed inwardly of the manhole, applying the desired force against the end 34 of the pipe, to wedge the O-ring 32 against the tapered surface 28. This force is maintained by the workman until the outside O-ring 33 is rolled along the exterior of the pipe 18 in the direction indicated by the arrow 35, until the O-ring 33 approaches the tapered surface 30.

Then, with the force still being applied by the workman against the end 34 of the pipe, another workman will force the O-ring 33 into the outer opening of the hole 24, as illustrated in FIG. 4c, preferably by the use of a swaging tool 36, applying a force thereto by the use of a mallet or the like. The swaging tool will be used to jam or force the O-ring 33 into tight clamping engagement between the tapered surface portion 30 and the pipe 18, as illustrated in FIG. 4c. At that point, the force applied by a workman or the like to the end 34 of the pipe 18 may be released, releasing slightly the compression on the O-ring 32, but with the forces that the O-rings 32 and 33 then apply to that portion of the pipe 18 extending therebetween, exerting tension forces, however small, on that portion of the pipe extending therebetween, thereby providing with the pipe 18 a clamping function, as well as the sealing function discussed above.

It will be apparent from the foregoing that various modifications may be made in the details of construction, as well as in the use and operation of the manhole, and of the connection of the present invention, all within the spirit and scope of the invention as defined in the appended claims. It will further be apparent that designations such as "rubber-like," include not only rubber, but synthetic rubbers and materials behaving similarly under the conditions of use of the present invention. Moreover, as defined herein "tapered" could be of any curved configuration, adapting itself to wedging as will be apparent from the context of the present invention. Terms such as "outwardly opening" refer to openings that enlarge as they near a surface, such as are defined by the surfaces 28 and 30. A "sharp" opening is one having a slope that has at least portions at a greater angle to the longitudinal axis (not illustrated) of the pipe 18 than for a longer, sloping, less sharp taper. Other term definitions will be apparent from the context of the present application.

What is claimed is:

1. In a connection of a pipe through a generally round hole in the wall of a manhole or like structure, the improvement residing in a sealing structure and comprising a pair of outwardly opening tapered openings in the wall structure, one on each side of the wall where it is intersected by the hole, and a pair of resiliently compressible ring members, each ring member being arranged in wedged and resiliently compressed engagement between a portion of the wall structure that defines a said tapered opening and an adjacent longitudinally disposed portion of pipe that extends through the hole in said wall structure, said ring members and tapered openings defining means (a) clamping said pipe portion under longitudinally directed tension forces in said pipe between compressed said ring members and (b) clamping said wall structure under corresponding longitudinally directed compressive forces between compressed said ring members.

2. The connection of claim 1, wherein one said tapered opening is of sharper opening than the other.

3. The connection of claim 1, wherein each said ring member comprises a complete ring of rubber-like material of generally circular cross-section, comprising means for providing water-tight radial seal between the wall structure and the pipe, in addition to providing clamping means.

4. The connection of claim 1, wherein a plurality of said connections are provided for a plurality of different pipes in a plurality of wall portions of the same wall structure, said structure being a generally cylindrical walled cast concrete manhole.

5. The apparatus of claim 1, wherein one said tapered opening is of sharper opening than the other, wherein each said ring member comprises a complete ring of rubber-like material of generally circular cross-section, comprising means for providing water-tight radial seal between the wall structure and the pipe, in addition to providing clamping means, wherein a plurality of said connections are provided for a plurality of different pipes in a plurality of wall portions of the same wall structure, said structure being a generally cylindrical walled cast concrete manhole.

6. The method of assembling a pipe to a wall of a manhole, comprising the steps of providing a manhole wall structure having a generally circular hole through a wall thereof, which hole has a pair of tapered generally circular openings, one on each side of the wall; placing the pipe through the hole with a portion of the pipe protruding beyond the wall in both directions; providing a first resilient compressible ring member over one end of the pipe and applying a force along the pipe to urge the pipe in a ring-member-compressing direction relative to the wall and compressing the first resilient ring member between one of the tapered surfaces of the tapered openings and the pipe; then, while maintaining a ring-member-compressing force on the pipe that continues the compression of said first ring member, providing a second resilient compressible ring member into the other tapered opening about the pipe; and forcing the second ring member into compression between said other tapered opening and the pipe; followed by a relaxation of the said ring-member-compressing force applied to said first ring member through the pipe to leave the ring members exerting (a) clamping tension forces in the pipe between locations of ring member engagement with the wall of the manhole and (b) clamping said wall structure under corresponding longitudinally directed compressive forces between compressed said ring members.

7. The method of claim 6, wherein the second ring member is first rolled along the pipe into the outer tapered opening and is then swaged into compression therein.

* * * * *